United States Patent [19]

Thomas

[11] Patent Number: 5,524,318
[45] Date of Patent: Jun. 11, 1996

[54] AIRCRAFT LOADING BRIDGE ADAPTER

[76] Inventor: Carroll M. Thomas, 913 Citation, Midland, Tex. 79705

[21] Appl. No.: 511,630

[22] Filed: Aug. 7, 1995

Related U.S. Application Data

[63] Continuation of Ser. No. 153,610, Nov. 17, 1993, abandoned.

[51] Int. Cl.$^6$ .................................................. E01D 1/00
[52] U.S. Cl. ............................................. 14/72.5; 182/141
[58] Field of Search ..................................... 14/69.5, 71.1, 14/71.3, 71.5, 71.7, 72.5; 182/141

[56] References Cited

U.S. PATENT DOCUMENTS

| | | |
|---|---|---|
| 2,778,674 | 1/1957 | Attendu .................................. 14/71.5 X |
| 2,885,242 | 5/1959 | Spatta . |
| 2,929,655 | 3/1960 | Hurter ...................................... 14/72.5 X |
| 3,263,253 | 8/1966 | Wollard et al. . |
| 3,263,254 | 8/1966 | Wollard et al. . |
| 3,274,629 | 9/1966 | Gearon et al. ........................... 14/71.1 |
| 3,341,874 | 9/1967 | Jarvis . |
| 3,369,264 | 2/1968 | Kurka et al. . |
| 3,404,417 | 10/1968 | Wollard et al. . |
| 3,462,784 | 8/1969 | Seipos . |
| 3,462,785 | 8/1969 | Seipos . |
| 3,537,745 | 11/1970 | Herring, Jr. ............................ 14/71.5 X |
| 3,599,262 | 8/1971 | Carder ........................................ 14/71 |
| 3,687,321 | 8/1972 | Goodhart et al. ............................ 14/71 |
| 3,793,662 | 2/1974 | Gacs . |
| 3,808,626 | 5/1974 | Magill . |
| 4,110,859 | 9/1978 | Lichti . |
| 4,120,067 | 10/1978 | Hone et al. . |
| 4,161,049 | 7/1979 | Saunders et al. . |
| 4,333,194 | 6/1982 | Drozd . |
| 4,333,195 | 6/1982 | Lichti . |
| 4,490,869 | 1/1985 | Morin . |
| 4,517,698 | 5/1985 | Lamp'l . |
| 4,620,339 | 11/1986 | Shepheard . |
| 4,657,111 | 4/1987 | Tremblay ............................ 182/141 X |
| 4,698,866 | 10/1987 | Kano . |
| 4,787,111 | 11/1988 | Pacek et al. . |
| 4,912,796 | 4/1990 | Crump . |
| 4,941,547 | 7/1990 | Livick . |
| 5,004,188 | 4/1991 | Donnesky et al. . |
| 5,040,257 | 8/1991 | Bentz . |
| 5,084,936 | 2/1992 | Thomas, Jr. . |
| 5,154,569 | 10/1992 | Eryou et al. . |

FOREIGN PATENT DOCUMENTS

| | | | |
|---|---|---|---|
| 1148982 | 7/1957 | France .................................... 14/71.7 |
| 051404 | 3/1989 | Japan ..................................... 14/71.5 |

OTHER PUBLICATIONS

"AMF Develops new air cargo handling System", American Machine & Foundry Company Stockholder News, Sep. 10, 1961, p. 5.

Article entitled "Airplane Loader", p. 155, Mar. 1945 issue of *Scientific American* magazine.

"NOW—all passengers enjoy safe, easy aircraft access with the Brownie Just Mobility System!", p. 108 of May/Jun. 1993 issue of *Airport* Magazine.

Pp. P1–P4 from *Jane's Airport Equipment*, copyrighted 1985 by Jane's Publishing Company Ltd., London, England.

*Primary Examiner*—Ramon S. Britts
*Assistant Examiner*—James A. Lisehora
*Attorney, Agent, or Firm*—John L. Sigalos

[57] ABSTRACT

A mobile self-propelled aircraft loading bridge adaptor for bridging between small aircraft and the conventional bridge entry ways provided at airports for use with standard size jets and similar aircraft. In one embodiment, the bridge is supported by spaced apart adjustable lifts that provide independent elevation and lowering of portions connected to the lifts. In another embodiment, a pivot is positioned at a predetermined location near one end of the bridge, and it is operative in combination with a hydraulic lift located near the other end of the bridge to provide desired adjustment. In still another embodiment, the bridge is deployed between a small aircraft and a bus.

20 Claims, 5 Drawing Sheets

AIRCRAFT LOADING BRIDGE ADAPTER

This application is a continuation of application Ser. No. 08/153,610, filed 11/17/93, now abandoned.

This invention relates to moveable aircraft loading ramps and more particularly to such ramps that are specially adapted for use with small aircraft.

BACKGROUND OF THE INVENTION

Adjustably positionable aircraft loading/unloading bridges have heretofore been proposed, illustrative of which are those described in U.S. Pat. Nos. 3,793,662; 3,808,626; and 5,084,936. In addition, there have been proposed bridge walkway extensions such as those described in U.S. Pat. Nos. 4,787,111 and 5,040,257; and there additionally have been proposed adapters to facilitate utilization by handicapped persons as illustrated by U.S. Pat. No. 5,154,569.

The foregoing proposals have generally been directed to standard size passenger and cargo aircraft and consequently have been relatively large in size and height. They have not generally been practicable for use with small aircraft such as those employed in feeder lines to smaller or outlying communities. Accordingly, persons emplaning or deplaning to and from small aircraft typically have had to walk from a doorway or the like over airport tarmac and thence up a stairway in order to enter a small airplane. When deplaning, just the reverse occurs, thus exposing passengers to inclement weather and hazards such as propellers, cables, and fueling hoses. Therefore, there has continued to be a need for a highly adjustable and enclosed passenger or cargo loading/unloading bridge that can be advantageously utilized with such small aircraft.

BRIEF SUMMARY OF THE INVENTION

The proposals of the present invention envision a highly adjustable passenger/cargo loading/unloading bridge which is specially adapted for use, as is, for emplaning and deplaning passengers, whether or not handicapped, directly to the ground (tarmac), to a terminal, or to a bus and which is adapted for connection to a conventional bus or bridge, to bridge between such conventional bridge and a small aircraft. This is accomplished through the utilization of a propellable platform on which there are located a pair of vertical supports which connect with the underside of the bridge housing and provide support therefor. In the preferred embodiment, both such vertical supports are made continuously and independently adjustable thereby providing for an optimum degree of coordination and bridging between small aircraft and the conventional bridge ordinarily employed with standard size aircraft. According to one alternative, coordinated control is provided for simultaneously activating both of the aforementioned lifts, and in another alternative, one actuatable lift is replaced with a stationary support and pivot which simplifies design and reduces cost. In addition, cooperation between the bridge housing and the small aircraft is facilitated through the provision of a fold-down extension that can be adjusted so as to complete the bridging between the small aircraft and/or bus and the bridge.

OBJECTS AND FEATURES OF THE INVENTION

It is one general object of the invention to improve bridge adaptors for connecting between small aircraft and conventional aircraft loading/unloading bridges or a bus.

It is another object of the invention to improve positioning and adjustability of such bridges.

It is still another object of the invention to facilitate loading and unloading of handicapped passengers to and from small aircraft.

It is yet another object of the invention to improve safety and to protect passengers from tarmac hazards such as airplane propellers, aircraft cables, fuel hoses and the like.

Accordingly, in accordance with one feature of the invention, a propellable vehicle platform is provided to impart a first level of maneuverability and positioning, thereby facilitating rapid deployment of the bridge.

In accordance with another feature of the invention, a pair of simple essentially rectilinear supports are provided between front and rear locations on the vehicle platform and corresponding locations on the lower exposed surfaces of the main enclosed bridge structure, thereby facilitating independent vertical adjustment of the ends of the bridge.

In accordance with yet another feature of the invention, provision is made for lateral movement of the enclosed bridge structure with respect to the vehicle platform, thereby improving adjustability, versatility and safety.

In accordance with still one further feature of the invention, an operator/driver position is located on the side front position of the vehicle platform adjacent the aircraft engine, thus facilitating monitoring of small aircraft propellers that usually are close to entry/exit hatches.

In accordance with yet another feature of the invention, an optional fold-down floor panel is provided at either or both ends of the enclosed bridge structure to facilitate fitting to the exit/entry geometries of the aircraft and/or bus.

In accordance with still a further feature of the invention, in an alternate embodiment in which the requirement for adjustability of one end of the bridge is reduced, a supporting pivot is used to replace one of the aforementioned rectilinear supports provided near one end of bridge, thereby further simplifying construction and further improving cost.

These and other objects and features of the invention will be apparent from the following detailed description, by way of preferred examples, with reference to the drawing.

DETAILED DESCRIPTION OF THE INVENTION

Figure 1:
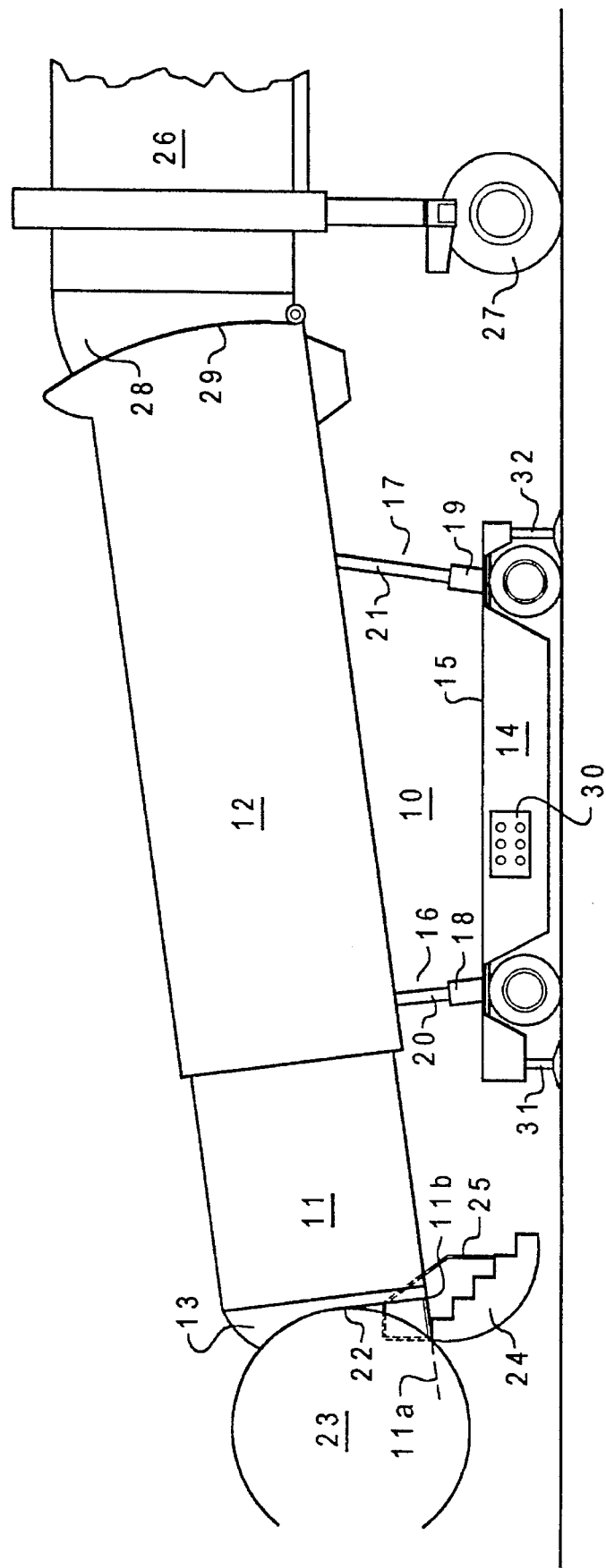
FIG. 1 is a side elevation view of the propellable bridge assembly illustrating the mobile supporting platform, a pair of vertical supports and the enclosed adjustable bridge structure.

Now turning to the drawing, and more particularly FIG. 1 thereof, it will be seen to depict a propellable telescoping bridge assembly 10 comprising forward telescoping bridge section 11, rear telescoping bridge section 12, forward extension 13, and mobile supporting platform 14. Extending upwardly from upper portion 15 of platform 14 are forward rectilinear support 16 and rear rectilinear support 17. Such supports are sufficiently wide and deep so as to obviate any necessity for additional vertical supports.

To facilitate positioning of the forward and rear bridge sections 11 and 12, supports 16 and 17 are provided with hydraulic cylinders 18 and 19 that are independently operable in response to controls such as those represented by control panel 30. As is known to those skilled in the art, such cylinders extend and retract extending portions 20 and 21 so as to controllably pivot the longitudinal axis of bridge sections 11 and 12 in such manner as to align the forward extension 13 of forward telescoping bridge section 11 with the entry/exit hatch 22 of small aircraft 23.

Some small aircraft are equipped with moveable stairs that swing downwardly when their entry/exit hatch is opened, and such stair and its associated railing are identified with numerals 24 and 25. Of course, it will be understood that when the bridge assembly 10 is emplaced as shown, stairs 24 and railing 25 are not used.

Further reference to the front of the forward section 11 reveals the presence of an optional swing down extension that is represented by dashed lines 11a. Such optional swing down extension may preferably be pivoted by a hinge 11b that connects it to the floor of extension 11 and is provided so as to accommodate the narrow exit/entry doors that are provided in some small aircraft. Of course, as will be evident to those skilled in the art, a similar hinged swing down extension may optionally be provided at the opposite end of the bridge.

Also shown in FIG. 1 is a conventional large aircraft loading/unloading bridge 26 which is typically supported in part by a conventional wheel 27. As is known to those skilled in the art, such conventional bridge is typically equipped with an adjustable forward extension such as extension 28; and to facilitate engagement therewith, there is provided along the rear terminus of rear bridge section 12, a conforming curved surface 29. Such conforming curved surface preferably simulates the curvature of a conventional large aircraft (not shown) for which large aircraft loading bridge 26 is designed.

As known to those skilled in the art, telescoping bridge sections are extended and retracted with conventional powered controls, and to facilitate extension and retraction of forward section 11 of the bridge such conventional controls are provided within section 12 or on the control panel 30 of mobile supporting platform 14.

It will be evident from an inspection of FIG. 1 that when extensions 20 and 21 are extended to different lengths, the bases will tend to swing slightly through small arcs of angle. Accordingly, provision is made to accommodate such through the inclusion of conventional swivels or the like (not shown). Provision also is made to secure the bridge, when deployed in its desired position through the lowering of four hydraulic stabilizing jacks that firmly engage upper surfaces of the airport tarmac. Such jacks (represented by jacks 31 and 32) are preferably located near the four corners of the supporting platform 14 and are controlled by conventional controls that are included among those of control panel 30.

Figure 2:
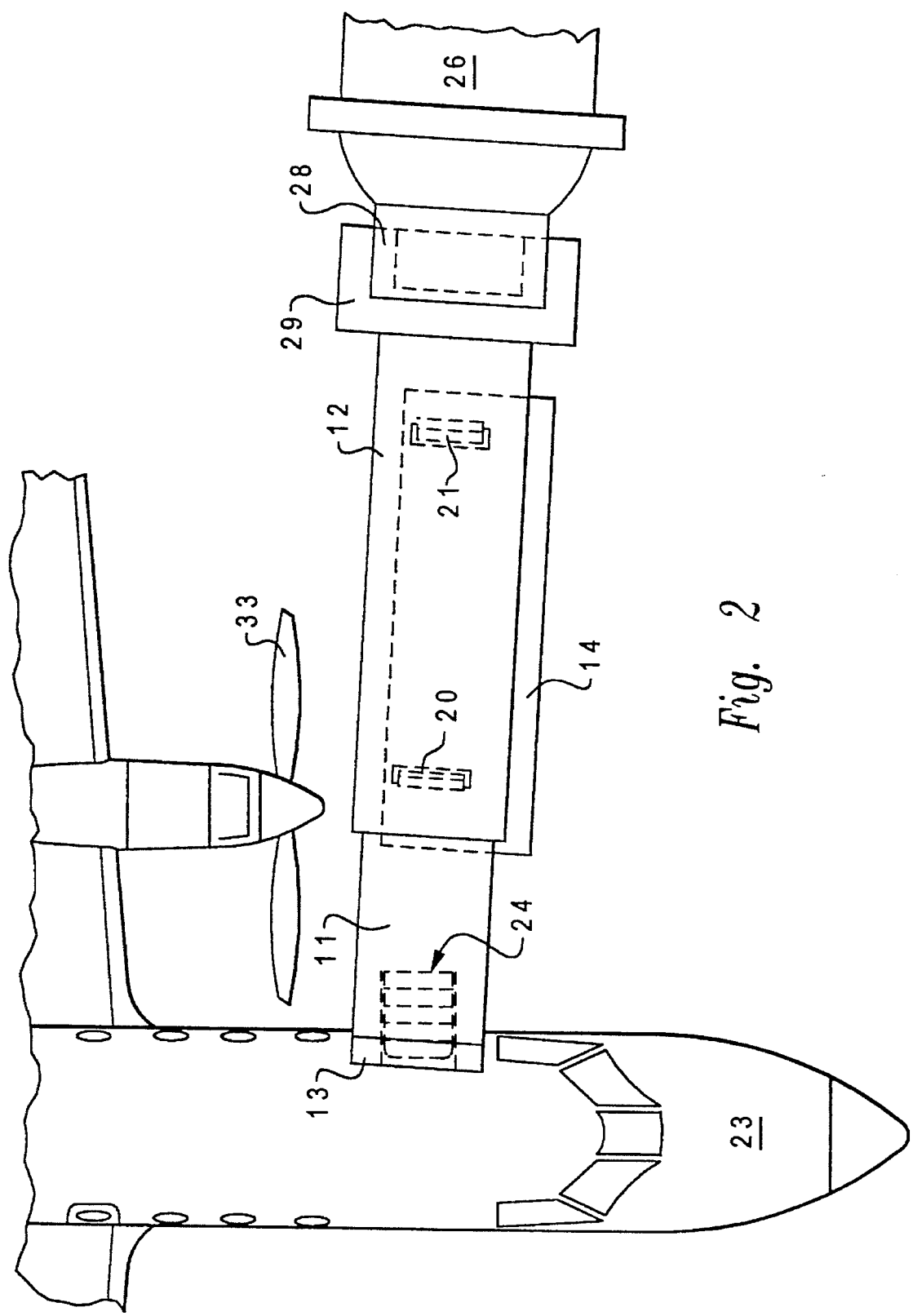
FIG. 2 is a top or plan view of the assembly of FIG. 1.

Now turning to FIG. 2, the assembly of FIG. 1 is seen from the top. There, in addition to parts described above, are depicted the aforementioned lateral adjusting feature whereby provision is made for relative lateral movement of the covered walkway portion of the bridge with respect to its supports 16 and 17. As will be recalled from the foregoing description of FIG. 1, extending portions 20 and 21 form the upper parts of forward and rear rectilinear supports 16 and 17. They engage the under carriage of rear telescoping section 12 as previously described. In order to provide lateral movement of the bridge section 12 with respect to mobile supporting platform 14, a pair of conventional tracks are provided in the base of section 12 between extensions 20/21 and the bridge section itself, thus providing for lateral movement therebetween. Such lateral movement is particularly attractive in situations where the center line of hatchway 22 is sufficiently close to the forward part of any nearby propellers (such as propellers 33) so as to present a safety hazard when positioning the platform 14. In such instances, platform 14 is positioned a safe distance away from the propellers, and if the bridge then is not in alignment with the hatchway 22, it is moved laterally by conventional hydraulic actuators under control of the operator, as by using control panel 30, to complete the desired alignment of the bridge section 11 with the hatch.

Figure 3:
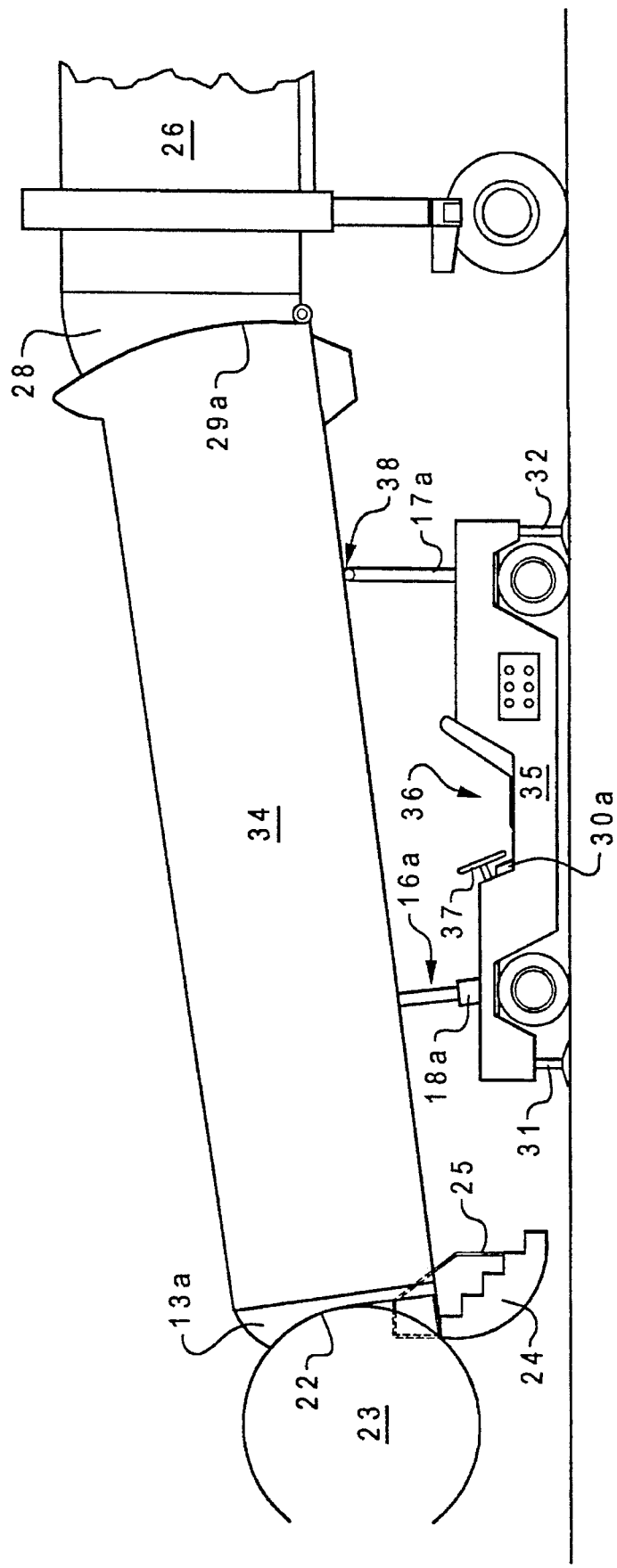
FIG. 3 is a side elevation view of an alternate embodiment assembly illustrating a self-propelling mobile supporting platform and a rear supporting pivot.

Now turning to FIG. 3, an alternate embodiment of the invention is seen. There, the telescoping bridge of FIGS. 1 and 2 is replaced with a unitary member, and the mobile supporting platform 14 is replaced with a self-propelled vehicle 35. In such event, the bridge is maneuvered generally into position by driving vehicle 35 to a position approximately engaging the bridge forward portion 13a with entry/exit hatch 22, and forward portion 13a is then adjusted using conventional adjustments to effect a good seal with the exterior of the airplane 23. Thereafter, and using the conventional controls normally positioned within conventional large aircraft loading bridge 26, the desired engagement is achieved between extension 28 and conforming curved surface 29a of the bridge.

As mentioned above, the embodiment of FIGS. 3 and 4 includes an engine (not shown) which may be a conventional gasoline/natural gas fueled internal combustion engine or a conventional battery-driven electric motor. A conventional drivers position is provided as at 36, and includes steering wheel 37 together with control panel 30a which corresponds to control panel 30 of FIGS. 1 and 2.

Further reference to FIG. 3 reveals the provision of one forward hydraulic cylinder 18a and one rear non-hydraulically actuated vertical rear rectilinear support 17a which generally corresponds to support 17 in FIGS. 1 and 2. However, in contrast with support 17, support 17a does not include a hydraulic actuator and instead includes a pivot support 38 at the upper end thereof, thus simplifying the design of the bridge adjusting system.

Figure 4:
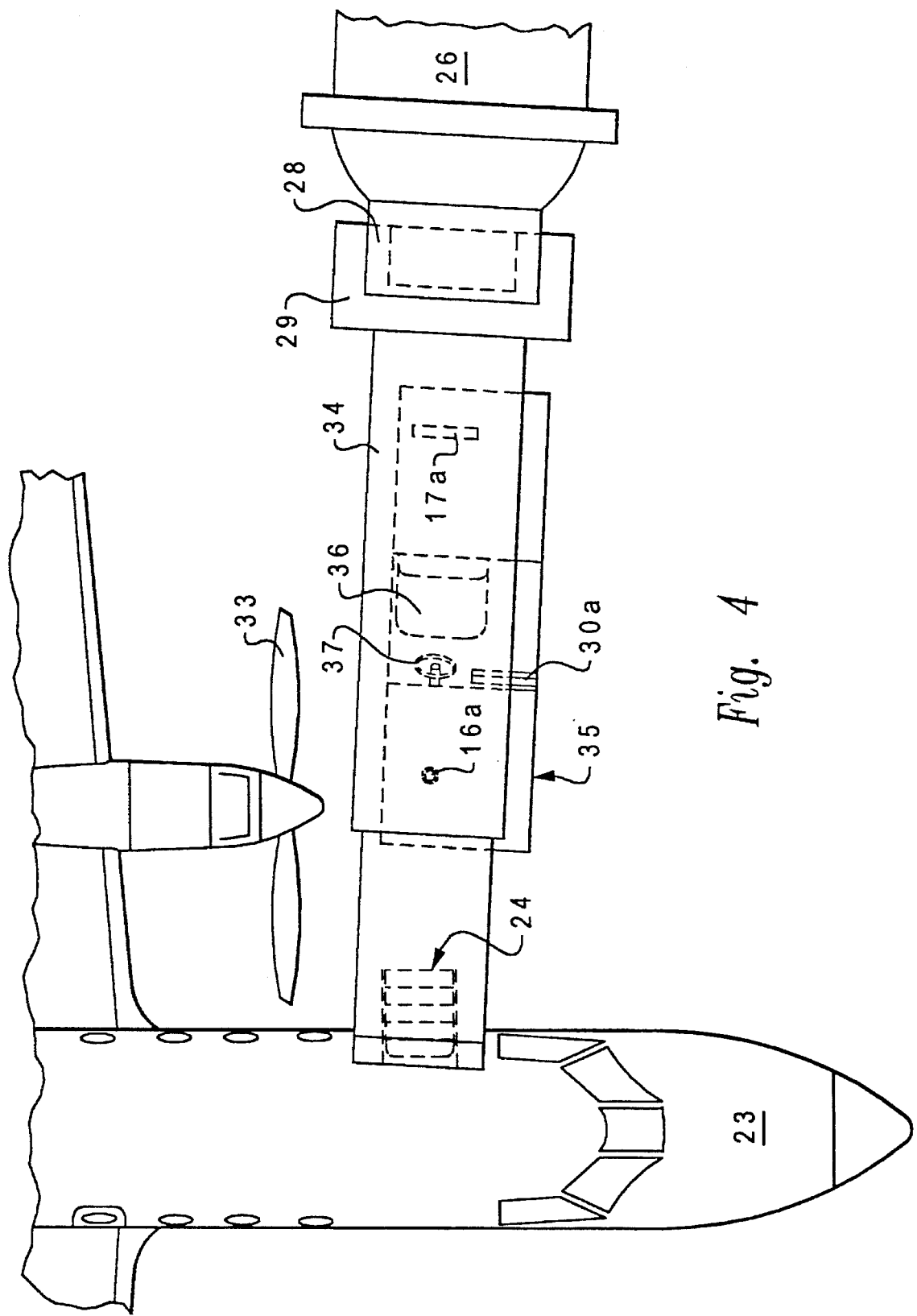
FIG. 4 is a top or plan view of the assembly of FIG. 3.

FIG. 4 generally corresponds to FIG. 3 in that it depicts the bridge 34 displaced laterally with respect to driving vehicle 35. As mentioned above in the description of FIG. 2, relative movement between vehicle 35 and bridge 34 is provided by conventional hydraulic controls and actuators, the controls for which preferably are included in control panel 30a.

Although the vertical extension of rear support 17a may be made fixed, there is included a way to change its length manually as, for example, by a conventional series of apertures therein through which conventional locking pins can manually be inserted. In such event, use with a variety of large aircraft loading bridges can be facilitated.

It should be noted that the drivers position 36 of vehicle 35 is preferably located on the side nearer to propeller 33 so as to provide the operator with the maximum visibility thereof. If it is desired to modify the vehicle to provide a drivers position on either side, either dual controls can be provided or a swinging steering column can be included.

It should also be noted that the embodiments hereof are also adaptable for use in emplaning and deplaning passengers, whether or not handicapped, directly to the ground (tarmac) as well as to a terminal or bus. Thus, for example, the length of mobile platform 14 or driving vehicle 35 may be shortened from the relative lengths depicted in the drawing so as to permit the forward ends of the bridges to engage the entry/exit hatch of the small aircraft while the rear extremity projects sufficiently beyond the opposite end of the mobile platform and is lowered sufficiently so as to contact the tarmac.

Figure 5:
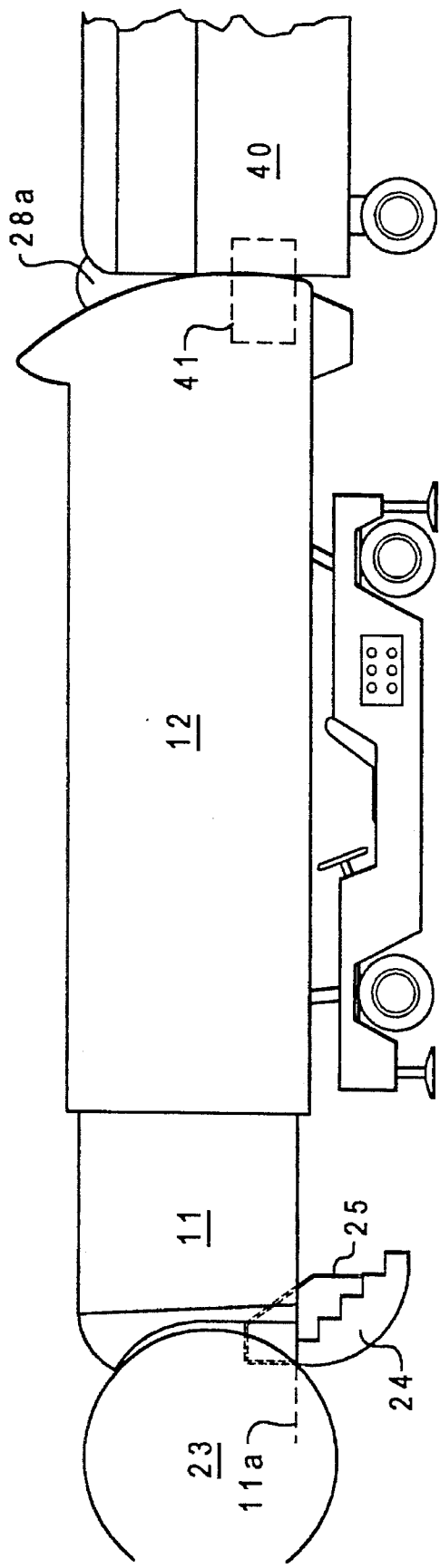
FIG. 5 is a side elevation view showing the bridge assembly when deployed for loading between a bus and a small airplane.

FIG. 5 depicts the bridge when interconnecting a small aircraft and a passenger bus. There, instead of conventional large aircraft loading bridge 26, there is shown a conventional bus 40. Also there will be seen the aformentioned swing down extension which is denoted 41 in FIG. 5. As smentioned above, such optional swing down extension is particularly useful in adapting the bridge to use when entry/exit ports are narrow in width and eliminates the need for climbing up or down the steps that typically extend inwardly in buses.

Figure 6:
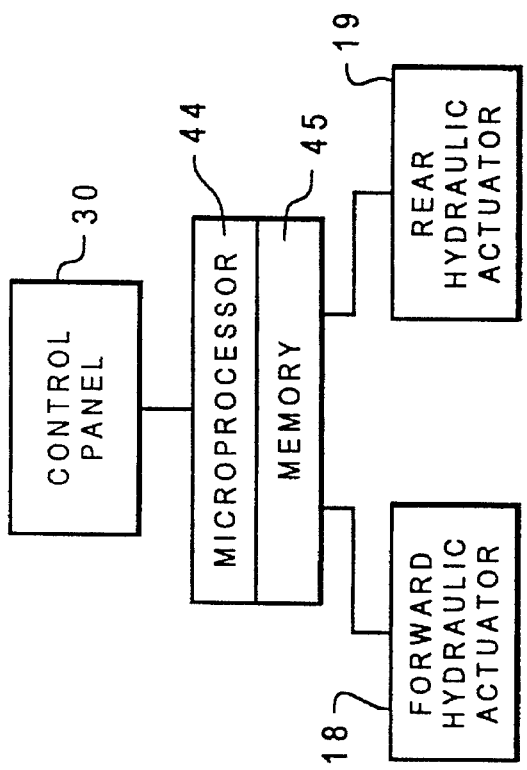
FIG. 6 illustrates control under automatic positioning.

FIG. 6 depicts the feature of automatic bridge positioning to which reference is made above. There, it will be seen, is control panel 30 (described above in connection with FIG. 1) containing manual and automatic controls for forward and rear hydraulic actuators 18 and 19. Also included is microprocessor 44 which includes memory 45 into which is stored a list of conventional small aircraft together with information regarding exit/entry door dimensions and positions on the aircraft fuselage. In order to position the bridge assembly automatically, conventional keys are depressed to select from a convential display on the control panel, the identity of the small aircraft to which the bridge is to be connected. The microprocessor 44 then accesses its memory 45 to obtain corresponding control data which is communicated to forward and rear hydraulic actuators 18 and 19 to position the bridge automatically. In the event that manual override is desired, a manual override button on control panel 30 is depressed, and the actuators are then individually controllable by conventional individual keys or buttons located on panel 30.

It will now be evident to those skilled in the art that there has been described herein an improved aircraft loading bridge adapter which provides enhanced versatility and ease of operation.

Although the invention hereof has been described by way of example of preferred embodiments, it will be evident that other adaptations and modifications can be employed without departing from the spirit and scope thereof. For example, lateral movement of the bridge with respect to its supporting platform could be provided by electric motors. Moreover, either of the propellable platforms could be motorless or equipped with motors for self propulsion.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. An aircraft loading bridge adaptor comprising:
   (a) an elongated mobile platform having a principal longitudinal axis;
   (b) an elongated enclosed bridge structure having its principal axis substantially parallel to said principal longitudinal axis;
   (c) a pair of spaced uniaxial essentially vertically disposed and independently controllable lifts connected between spaced locations on said platform and corresponding locations on said enclosed bridge, said pair of lifts controllably and exclusively supporting said bridge; and
   (d) control means for continuously and independently changing lengths of said lifts thereby correspondingly raising and lowering said bridge.

2. An aircraft loading bridge adaptor according to claim 1 further including a pivot interconnecting an upper end of one of said lifts with said enclosed bridge structure.

3. An aircraft loading bridge adaptor according to claim 1 in which said elongated mobile platform includes means for self-locomotion.

4. An aircraft loading bridge adaptor according to claim 3 in which said means for self-locomotion includes an engine.

5. An aircraft loading bridge adaptor according to claim 4 and further including a driver/operator position located on said mobile platform external to said enclosed bridge structure and adjacent an end facing an aircraft and at a side adapted for positioning adjacent aircraft propellers.

6. An aircraft loading bridge adaptor according to claim 3 and further including a driver/operator position located on said mobile platform external to said enclosed bridge structure and adjacent an end facing an aircraft and at a side adapted for positioning adjacent aircraft propellers.

7. An aircraft loading bridge adaptor according to claim 1 further including moving means for moving all of said enclosed bridge structure horizontally, essentially at 90 degrees to said principal longitudinal axis, through a predetermined distance with respect to said pair of lifts.

8. An aircraft loading bridge adaptor according to claim 7, in which said moving means is interconnected between upper end portions of said lifts and lower structure portions of said enclosed bridge structure.

9. An aircraft loading bridge adaptor according to claim 1 in which said control means further includes means for automatically actuating said lifts to position said enclosed bridge structure in alignment with an entry/exit portal according to selected aircraft type.

10. An aircraft loading bridge adaptor according to claim 1 further including at one end of said bridge adaptor swing-down extension means for connecting a walking surface of said bridge adaptor to said aircraft.

11. An aircraft loading bridge adaptor according to claim 1 further including at one end of said bridge adaptor swing-down extension means for connecting a walking surface of said bridge adaptor to said aircraft and including at another end of said bridge adaptor folding extension means for connecting said bridge adaptor to another structure.

12. An aircraft loading bridge adaptor comprising:
   (a) an elongated mobile platform having a principal longitudinal axis;
   (b) an elongated enclosed bridge structure having its principal axis substantially parallel to said principal longitudinal axis;
   (c) a pair of spaced uniaxial essentially vertically disposed and independent lifts connected between spaced locations on said platform and corresponding locations on said enclosed bridge, said pair of lifts exclusively supporting said bridge;
   (d) control means for continuously changing length of one of said pair of lifts; and
   (e) a pivot interconnecting an upper end of the other of said pair of lifts with said enclosed bridge structure.

13. An aircraft loading bridge adaptor according to claim 12 in which said elongated mobile platform includes means for self-locomotion.

14. An aircraft loading bridge adaptor according to claim 13 in which said means for self-locomotion includes an engine.

15. An aircraft loading bridge adaptor according to claim 13 and further including a driver/operator position located on said mobile platform external to said enclosed bridge structure and adjacent an end facing an aircraft and at a side adapted for positioning adjacent aircraft propellers.

16. An aircraft loading bridge adaptor according to claim 12 further including moving means for moving all of said enclosed bridge structure horizontally, essentially at 90 degrees to said principal longitudinal axis, through a predetermined distance with respect to said pair of lifts.

17. An aircraft loading bridge adaptor according to claim 16, in which said moving means is interconnected between upper end portions of said lifts and lower structure portions of said enclosed bridge structure.

18. An aircraft loading bridge adaptor according to claim 17 and further including a driver/operator position located adjacent an end facing an aircraft and at a side adapted for positioning adjacent aircraft propellers.

19. An aircraft loading bridge adaptor according to claim 12 in which said control means further includes means for automatically actuating said lifts to position said enclosed bridge structure in alignment with an entry/exit portal according to selected aircraft type.

20. An aircraft loading bridge adaptor according to claim 12 further including at one end of said bridge adaptor swing-down extension means for connecting a walking surface of said bridge adaptor to said aircraft.

* * * * *